(12) United States Patent
Hayes

(10) Patent No.: US 11,802,566 B2
(45) Date of Patent: Oct. 31, 2023

(54) PUMP SYSTEM FOR LIQUID TRANSPORT TANK

(71) Applicant: Roger Hayes, Adelanto, CA (US)

(72) Inventor: Roger Hayes, Adelanto, CA (US)

( * ) Notice: Subject to any disclaimer, the term of this patent is extended or adjusted under 35 U.S.C. 154(b) by 0 days.

(21) Appl. No.: 17/183,063

(22) Filed: Feb. 23, 2021

(65) Prior Publication Data
US 2021/0270273 A1    Sep. 2, 2021

Related U.S. Application Data

(60) Provisional application No. 62/983,383, filed on Feb. 28, 2020.

(51) Int. Cl.
*F04D 13/16* (2006.01)
*F04D 13/04* (2006.01)
*F04D 1/00* (2006.01)

(52) U.S. Cl.
CPC .............. *F04D 13/16* (2013.01); *F04D 1/00* (2013.01); *F04D 13/046* (2013.01)

(58) Field of Classification Search
None
See application file for complete search history.

(56) References Cited

U.S. PATENT DOCUMENTS

| | | | | |
|---|---|---|---|---|
| 2,060,484 A | * | 11/1936 | Barrett | B60P 3/24 222/627 |
| 3,086,472 A | * | 4/1963 | Lorenzetti | F04D 13/066 417/424.2 |
| 3,583,833 A | * | 6/1971 | Huber | F02M 37/103 417/423.12 |
| 3,810,487 A | * | 5/1974 | Cable | B60P 3/14 296/24.32 |
| 3,866,433 A | * | 2/1975 | Krug | B60D 1/242 62/226 |
| 4,311,274 A | * | 1/1982 | Neal | B05B 15/25 239/575 |
| 4,934,914 A | * | 6/1990 | Kobayashi | F04D 13/086 417/434 |
| 5,181,838 A | * | 1/1993 | Sato | F04D 29/606 417/423.15 |
| 5,226,294 A | * | 7/1993 | Mayer | B60H 1/3226 62/323.3 |
| 5,498,141 A | * | 3/1996 | Agger | F04D 13/04 417/390 |
| 5,848,538 A | * | 12/1998 | Tischer | F04D 29/582 62/468 |

(Continued)

FOREIGN PATENT DOCUMENTS

GB            991325 A  *  5/1965

*Primary Examiner* — Bryan M Lettman
*Assistant Examiner* — Geoffrey S Lee
(74) *Attorney, Agent, or Firm* — KNOBBE, MARTENS, OLSON & BEAR LLP

(57) ABSTRACT

A tank for transporting and spraying a liquid having a plurality of walls forming a receptacle configured to receive the liquid and a pump system supported by at least one of the plurality of walls. The pump system has a liquid end and a power frame with at least a portion of the power frame being disposed in the receptacle. In some implementations, the tank has a reservoir disposed in proximity to one of the plurality of walls. The reservoir provides a working fluid to the portion of the power frame disposed in the receptacle.

15 Claims, 13 Drawing Sheets

(56) References Cited

U.S. PATENT DOCUMENTS

| | | | | |
|---|---|---|---|---|
| 6,065,297 A | * | 5/2000 | Tischer | F25B 31/008 |
| | | | | 62/505 |
| 6,098,422 A | * | 8/2000 | Tischer | F04D 29/2277 |
| | | | | 62/468 |
| 8,714,949 B2 | * | 5/2014 | Opel | H02K 7/14 |
| | | | | 417/423.8 |
| 2008/0038126 A1 | * | 2/2008 | Berroth | F04D 25/026 |
| | | | | 415/60 |
| 2010/0187352 A1 | * | 7/2010 | Yavilevich | B64D 37/04 |
| | | | | 244/45 R |

\* cited by examiner

PUMP SYSTEM FOR LIQUID TRANSPORT TANK

CROSS-REFERENCE TO RELATED APPLICATION

This application claims benefit under 35 U.S.C. 119(e) to U.S. Provisional Patent App. No. 62/983,383, filed Feb. 28, 2020, the entire disclosure of which is hereby incorporated by reference herein in its entirety. Any and all priority claims identified in the Application Data Sheet, or any corrections thereto, are hereby incorporated by reference under 37 CFR 1.57.

FIELD

This disclosure generally relates to pump systems for vehicles used for transporting and spraying liquids. The pump system is driven through the use of a hydraulic system to spray liquid from a tank. More specifically, the hydraulic system flow is directed to a motor for driving a liquid distribution pump.

BACKGROUND

Tank carrying vehicles are used to transport liquids. The vehicle can include a pump designed to pump the liquid from inside a tank and spray or expel the pumped liquid at high pressure. The pump is secured to the chassis of the vehicle in proximity to the tank and driven by a hydraulic system.

SUMMARY

The devices of the present invention have several features, no single one of which is solely responsible for its desirable attributes. Without limiting the scope of this invention as expressed by the claims which follow, its more prominent features will now be discussed briefly. After considering this discussion, and particularly after reading the section entitled "Detailed Description," one will understand how the features of this invention provide several advantages over current designs.

An aspect of the present disclosure provides a tank body for transporting and spraying a liquid. The tank body includes a plurality of walls forming a receptacle configured to receive the liquid and a pump system supported by at least one of the plurality of walls. The pump system includes a liquid end and a power frame. At least a portion of the power frame is disposed in the receptacle.

Another aspect of the present disclosure provides a tank for transporting a liquid and spraying the liquid via a pump. The tank includes a plurality of walls forming a receptacle configured to receive the liquid and a reservoir disposed in proximity to one of the plurality of walls. The reservoir is configured to provide a working fluid to the pump.

Another aspect of the present disclosure provides tank for transporting and spraying a liquid. The tank includes a plurality of walls forming a receptacle configured to receive the liquid and a pump system supported by at least one of the plurality of walls. The pump system includes a liquid end and a power frame. At least a portion of the power frame is disposed in the receptacle. The tank further includes a reservoir disposed in proximity to one of the plurality of walls. The reservoir provides a working fluid to the portion of the power frame disposed in the receptacle. The reservoir holds the working fluid.

Further aspects, features and advantages of the present invention will become apparent from the detailed description that follows.

BRIEF DESCRIPTION OF THE DRAWINGS

Various examples are depicted in the accompanying drawings for illustrative purposes and should in no way be interpreted as limiting the scope of the examples. Various features of different disclosed examples can be combined to form additional examples, which are part of this disclosure.

DETAILED DESCRIPTION

The various features and advantages of the systems, devices, and methods of the technology described herein will become more fully apparent from the following description of the examples illustrated in the figures. These examples are intended to illustrate the principles of this disclosure, and this disclosure should not be limited to merely the illustrated examples. The features of the illustrated examples can be modified, combined, removed, and/or substituted as will be apparent to those of ordinary skill in the art upon consideration of the principles disclosed herein.

Figure 1:
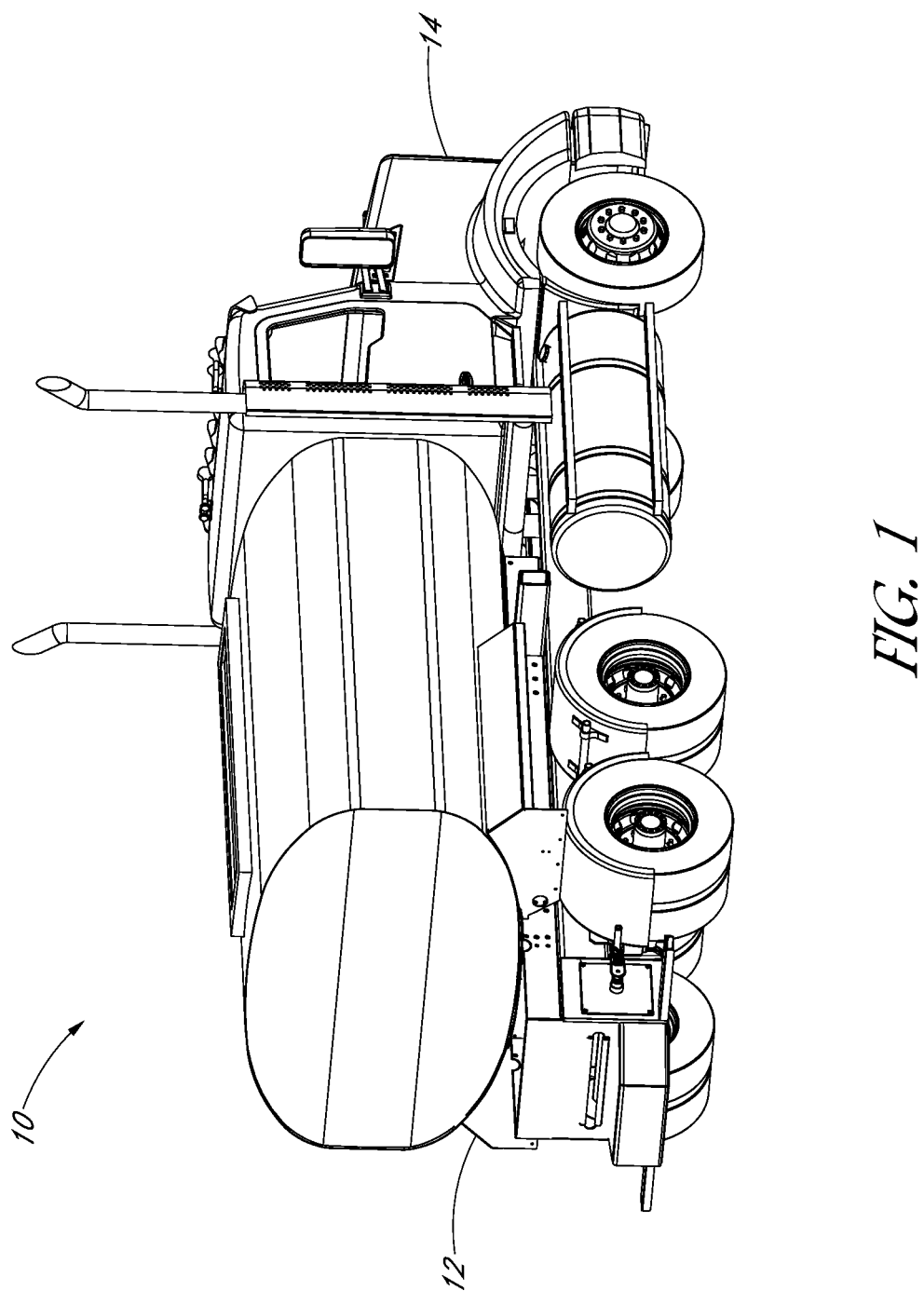
FIG. 1 is a perspective view of a truck including a tank body supported by a chassis.
Figure 2:
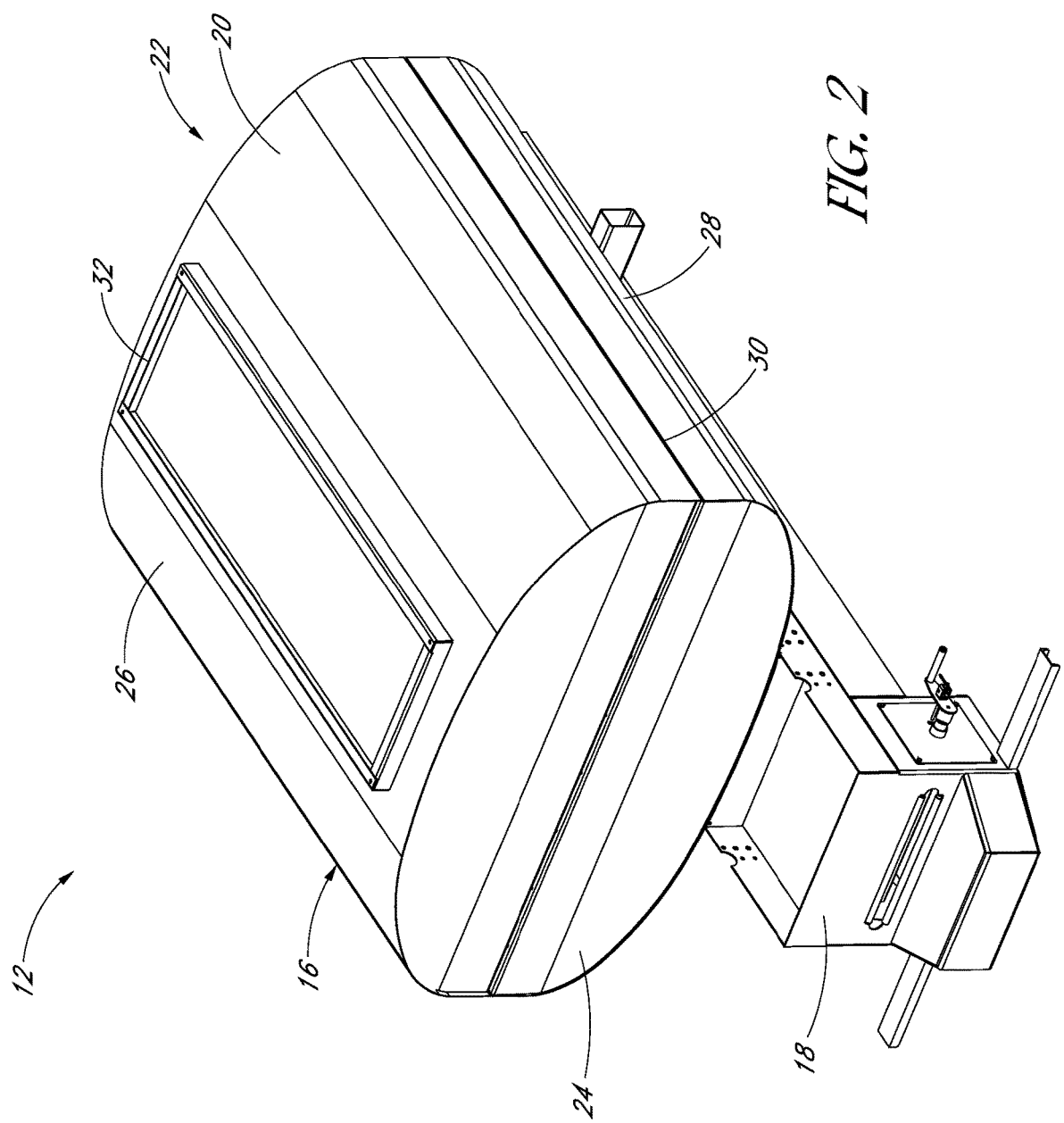
FIG. 2 is a rear perspective view of the tank body removed from the chassis according to a preferred embodiment of the present invention.

FIG. 1 is a perspective view of a truck 10 including a tank body 12 supported by a chassis 14. The truck 10 can be a motor vehicle or other transportation means. FIG. 2 is a rear perspective view of the tank body 12 removed from the truck 10 according to a preferred embodiment of the present invention. In certain embodiments, the tank body 12 can comprise a tank 16 supported by a frame 18.

The tank 16 can have various uses. For example, the tank 16 can be used in the petroleum industry for the storage or transportation of fuel or oil in liquid form. Other exemplary uses include storage or transportation of liquids in the farming, forestry, construction, mining, chemical, water, or other industries.

In certain embodiments, the tank 16 can rest on the frame 18. In certain embodiments, the tank 16 can be attached to the frame 18, either permanently or temporarily. In this way, in certain embodiments, the frame 18 can be used for supporting, storing and/or transporting the tank 16.

In certain embodiments, the tank 16 includes an outer wall 20. In certain embodiments, the outer wall 20 can encase an interior space forming a receptacle 17. The receptacle 17 can be used for storage of a liquid. The outer wall 20 can contain the liquid. The receptacle 17 can optionally be filled with the liquid and emptied of the liquid as explained below.

In certain embodiments, the outer wall 20 can include a plurality of panels. In certain embodiments, the outer wall 20 is 10 gauge. In certain embodiments, the panels can be curved and/or flat regions that together form the outer wall 20 that encloses the receptacle 17. The outer wall 20 can have a form factor. The form factor can generally be or include rectangular, circular, hexagonal, elliptical, polygonal, irregular, or any other suitable prism shapes.

In certain embodiments, the outer wall 20 can form a one-piece tank or a multi-piece tank as explained below. In embodiments of a one-piece tank as is illustrated in FIG. 1, the outer wall 20 is formed into the shape of the tank 16. For example, in certain embodiments, the tank 16 can be manufactured to include a front head 22 and a rear head 24 welded to a central body.

In certain embodiments of the tank 16, the outer wall 20 can comprises a top portion 26 and a bottom portion 28. The top portion 26 and the bottom portion 28 can cooperate to enclose the receptacle 17. For example, the top portion 26 and the bottom portion 28 can be welded together along with the front head 22 and the rear head 24 to form a one-piece tank.

In certain embodiments, the top portion 26 and the bottom portion 28 can each include a singular piece and/or a single material. In certain embodiments, the top portion 26 and the bottom portion 28 can include steel, stainless steel, galvanized steel, plastic, aluminum, fiberglass, Strenex, chrome-ally, galvanneal, enduraplas, or any other suitable material.

In certain embodiments, the top portion 26 and the bottom portion 28 can be formed out of a plurality of connected panels. In some implementations, the material of the top portion 26 can be the same as the material of the bottom portion 28. In other implementations, the top portion 26 can be a different material than the bottom portion 28. In certain embodiments, the bottom portion 28 is a steel or stainless steel and the top portion 26 is a fiberglass material. In another embodiment, the bottom portion 28 is a stainless steel and the top portion 26 is a steel. Any other combination of the above materials, including other materials not listed herein, is contemplated herein.

In certain embodiments, the top portion 26 and the bottom portion 28 can connect at an interface 30. In certain embodiments, the interface 30 can extend along a horizontal plane dividing the top portion 26 from the bottom portion 28. In other embodiments, the interface 30 can be located within multiple different planes. In other embodiments, the interface 30 can include multiple protrusions and interlocking valleys. In other embodiments, the interface 30 can be located within a non-horizontal plane.

In certain embodiments, the top portion 26 and the bottom portion 28 can be permanently attached together at the interface 30 such as by welding, or releasably attached at the interface 30 such as with mechanical fasteners to connect and/or otherwise releasably seal together the top portion 26 and the bottom portion 28. Mechanical fasteners can include, for example, nuts and bolts.

In certain embodiments, the tank 16 can include an opening 32 as will be further described below. In certain embodiments, the tank 16 can also include a drain 34 in the bottom portion 28 (see FIG. 13). In certain embodiments, a diameter of the drain 34 can be sized to provide sufficient flow to feed the pump system 40.

Figure 3:
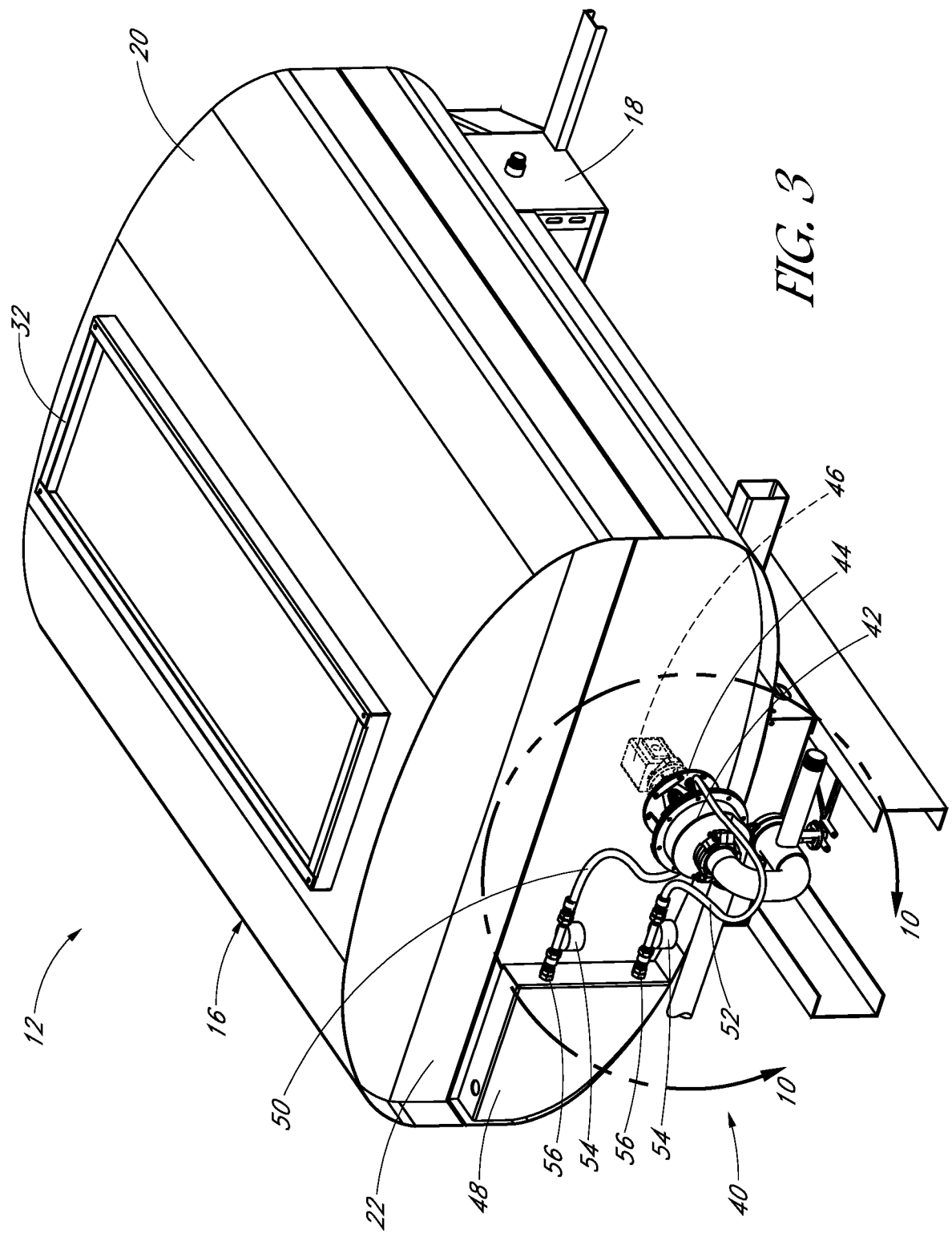
FIG. 3 is a front perspective view of the tank body from FIG. 2 showing a pump system that includes a liquid end disposed outside of a tank, a power frame of the pump system disposed in the tank in dashed lines, and a hydraulic fluid reservoir in contact with a surface of the tank.

FIG. 3 is a front perspective view of the tank body 12 from FIG. 2 showing a pump system 40. In certain embodiments, the pump system 40 can include any type of pump, for example, a positive displacement pump, a centrifugal pump, or an axial-flow pump. In certain embodiments, a positive displacement pump moves fluid by trapping a fixed amount and forcing or displacing that trapped volume into the discharge pipe. In certain embodiments, a centrifugal pump changes a direction of flow of the fluid by ninety degrees as the fluid flows over an impeller. In an axial flow pump, the direction of flow is unchanged through the pump. The embodiment of the pump system 40 illustrated in FIG. 3 is a centrifugal pump. Further, the illustrated pump is a single-stage pump. Of course, the disclosure is not limited to the pump system 40 being a centrifugal pump or single-stage. The pump system 40 can be any type of pump useful for converting rotational energy to energy in a moving fluid known to a person having ordinary skill in the art.

In certain embodiments, the pump system 40 includes a liquid end 42 and a power frame 44. In certain embodiments, the liquid end 42 and the power frame 44 are set up in a direct drive configuration.

In certain embodiments, the power frame 44 include a motor 46. The motor 46 is configured to provide rotational energy to the liquid end 42 of the pump system 40. In certain embodiments, the motor 46 can be an electric motor, a pneumatic motor, or a hydraulic motor. Pneumatic motors and hydraulic motors both rely on a working fluid. The working fluid for a pneumatic motor is in the form of a gas while the working fluid for a hydraulic motor is in the form of an incompressible liquid.

The motor 46 in the embodiment of the pump system 40 illustrated in FIG. 3 includes a hydraulic motor. Exemplary types of hydraulic motors 46 include gear motors, vane motors, piston motors, gerotor motors, and gerolor motors as understood by a person having ordinary skill in the art. This disclosure contemplates the use of any type of motor 46 and in the case where the motor 46 is a hydraulic motor 46, contemplates the use of any type of hydraulic motor 46. While the disclosure recites hydraulic motor 46 for ease of explanation, the disclosure is not limited to the motor 46 of the pump system 40 being a hydraulic motor 46. The pump system 40 can be any type of motor useful for generating rotational energy known to a person having ordinary skill in the art.

In certain embodiments, at least a portion of the liquid end 42 of the pump system 40 is disposed outside of the tank 16. In certain embodiments, at least a portion of the power frame 44 is disposed in the tank 16. In certain embodiments, the portion of the power frame 44 disposed in the tank 16 is the hydraulic motor 46. Accordingly, in some embodiments, portions of the pump system 40 are disposed in and out of the tank 16.

In certain embodiments, the portion of the outer wall 20 where the pump system 40 passes through the outer wall 20 is 10 gauge cast iron or stainless steel. Of course, the thickness of the outer wall 20 can be any gauge and is not limited to the listed thickness. In certain embodiments, the portion of the outer wall 20 includes a doubler that increases the thickness of the outer wall 20 in the region of the pump system 40. In certain embodiments, the doubler has a 0.25 inch thickness.

In certain embodiments, locating the hydraulic motor 46 in the tank 16 can reduce operating temperatures of the hydraulic motor 46 because heat transfers from the hydraulic motor 46 to the liquid in the tank 16. In certain embodiments where the hydraulic motor 46 is disposed in the tank 16, any need for an external heat exchanger to cool a working fluid can be reduced or entirely extinguished. In this way, in certain embodiments, the reliability of the hydraulic motor 46 when operated with a heat exchanger for the working fluid is maintained even if the heat exchanger is removed from the pump system 40. In certain embodiments, the heat transfer from the hydraulic motor 46 to the liquid in the tank 16 compensates for the loss of the heat exchanger in the pump system 40.

In certain embodiments, the pump system 40 further includes a reservoir 48. In certain embodiments, the reservoir 48 contains a working fluid. Exemplary working fluids include hydraulic fluid and food grade oil. For example, a food grade oil specified by the National Sanitation Foundation (NSF) can be employed as the working fluid.

In certain embodiments, the reservoir 48 is placed in close proximity to the tank 16 to promote heat transfer from the working fluid in the reservoir 48, through a wall/barrier between the working fluid and the liquid in the tank 16, and finally to the liquid itself. For example, energy can transfer via conduction through the wall/barrier.

In the illustrated embodiment, the reservoir 48 is disposed outside the tank 16 and on the front head 22. Of course, the reservoir 48 need not be placed outside the tank 16 or on the front head 22. In other embodiments, the reservoir 48 is disposed inside the tank 16. In other embodiments, the reservoir 48 is disposed outside the tank 16 and on the rear head 24. In other embodiments, the reservoir 48 is disposed on any of the one or more surfaces of the outer wall 20. For example, the reservoir 48 can be placed on the bottom portion 28 of the tank 16. It may be advantageous to dispose the reservoir 48 in a lower region of the tank 16 to maintain close proximity between the working fluid and the liquid in the tank 16 as the level of the liquid drops in the tank 16.

In certain embodiments, the wall/barrier is the outer wall 20. In certain other embodiments, there is no outer wall 20 in the region of the reservoir 48. Instead, a wall of the reservoir 48 is the wall/barrier between the working fluid in the reservoir 48 and the liquid in the tank 16. In certain other embodiments, the wall/barrier is the wall of the reservoir 48 and the outer wall 20.

In certain embodiments where the wall/barrier includes the wall of the reservoir 48 and the outer wall 20, a paste or other conductive material can be placed between the wall of the reservoir 48 and the outer wall 20 to promote heat transfer there between. In certain embodiments, a coating is placed on one or more of the surfaces of the wall/barrier that promotes heat transfer.

In certain embodiments, it may be advantageous to increase a contact surface area between the reservoir 48 and the tank 16 which will increase heat transfer there between. For example, in certain embodiments, adjacent surfaces of the wall/barrier include mechanical features, such as polishing, to increase contact and promote heat transfer there between.

In certain embodiments, it may be advantageous to align a flow path for the working fluid entering the reservoir 48. For example, in certain embodiments, a flow path of the working fluid entering the reservoir 48 is selected to cause the working fluid to contact the barrier/wall before completely mixing with the working fluid already in the reservoir 48.

In certain embodiments, a pump (not shown) pressurizes the working fluid in the reservoir 48. In certain embodiments, the pressurized working fluid flows from inside the reservoir 48 to the hydraulic motor 46 via inlet line 50. In embodiments where the hydraulic motor 46 is disposed inside the tank 16 and the reservoir 48 is disposed outside the tank 16, the inlet line 50 can pass through the outer wall 20. For example, in certain embodiments, the inlet line 50 can pass through an opening in the outer wall 20. In other embodiments, the inlet line 50 passes through the outer wall 20 at the location of the reservoir 48. In the illustrated embodiment, the inlet line 50 passes through the pump system 40 which itself passes through the outer wall 20.

In certain embodiments, the hydraulic motor 46 or rotary actuator converts the energy of the working fluid flowing from the inlet line 50 into mechanical power. In certain embodiments, the hydraulic motor 46 then applies the mechanical power to the liquid end 42 of the pump system 40 via a drive shaft 92 (see FIG. 16). In certain embodiments, the mechanical power is used to drive an impeller 110 of the liquid end 42 through the drive shaft 92. In this way, the energy of the working fluid entering the hydraulic motor 46 is eventually converted to hydraulic power for pumping the liquid from the tank 16. The drive shaft 92 is rotated by the hydraulic motor 46 on one end which rotates the liquid end 42 of the pump system 40 at the opposite end of the drive shaft 92.

In certain embodiments, the impeller 110 can comprise aluminum, plastic, cast iron, bronze, or any other material. In certain embodiments, the impeller 110 is cast aluminum. In certain embodiments, the selection of material for the impeller 110 may be dictated in part by requirements for corrosion, erosion and/or cavitation resistance.

In certain embodiments, the hydraulic motor 46 can have a fixed or variable displacement. For example, in certain embodiments, hydraulic motors 46 that have a fixed displacement rotate the drive shaft 92 at a constant speed while a constant input flow is provided. In certain embodiments, hydraulic motors 46 that have a fixed displacement provide constant torque. In contrast, hydraulic motors 46 that have a variable displacement can vary their flow rates by changing the displacement. In this way, in certain embodiments, the hydraulic motor 46 is able to output variable torque and speed. In certain embodiments, the hydraulic motor 46 operates bidirectional or unidirectional. In certain embodiments, the flow rate of the hydraulic motor 46 is the volume of the working fluid entering the hydraulic motor 46 per unit of time.

Referring to FIG. 3, after passing through the hydraulic motor 46, the working fluid is directed through a return line 52 and eventually to the reservoir 48. In embodiments where the hydraulic motor 46 is disposed inside the tank 16 and the reservoir 48 is disposed outside the tank 16, the return line 52 passes through the outer wall 20. For example, the return line 52 can pass through an opening in the outer wall 20. In other embodiments, the return line 52 passes through the outer wall 20 at the location of the reservoir 48. In the illustrated embodiment, the return line 52 passes through the pump system 40 which itself passes through the outer wall 20.

In certain embodiments, one or more filters 54 are employed to filter the working fluid as the working fluid passes through the inlet line 50 and/or the return line 52. In certain embodiments, quick connect couplings 56 provide the hydraulic connections between the reservoir 48 and the inlet line 50 and the return line 52.

In certain embodiments, the pump system 40 includes a control which allows the user to adjust the flow of working fluid entering the hydraulic motor 46.

Figure 4:
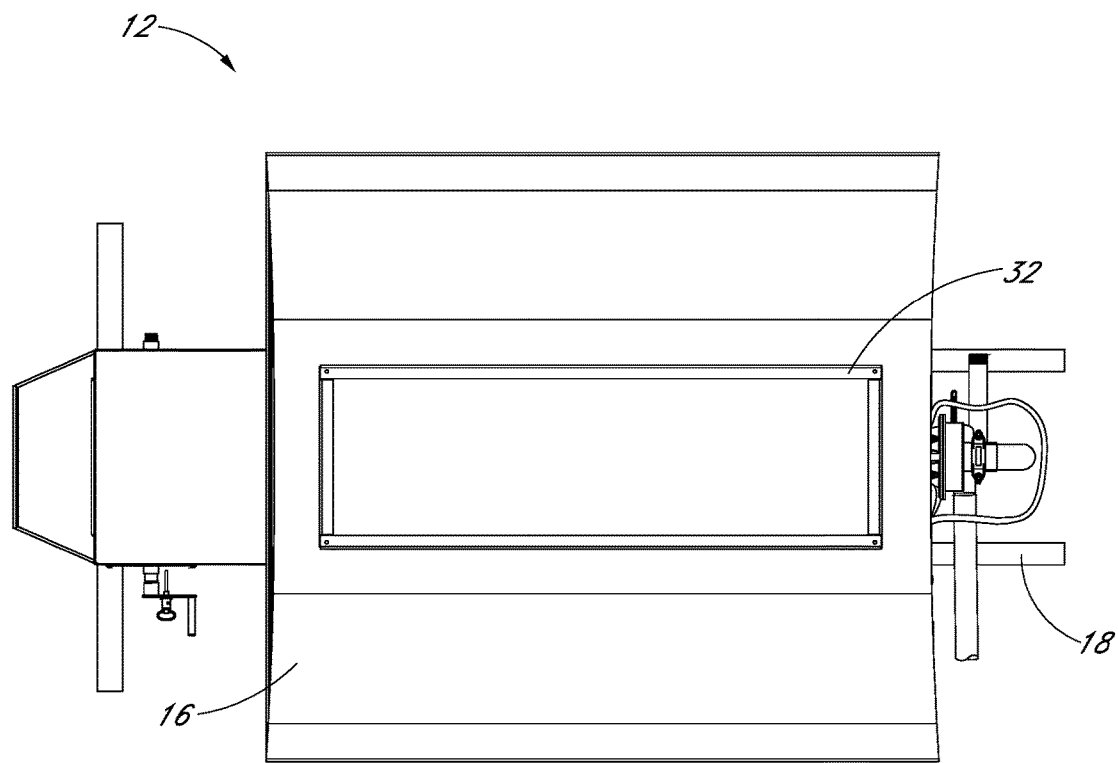
FIG. 4 is a top view of the tank body of FIG. 2.

FIG. 4 is a top view of the tank body 12 of FIG. 2 showing the opening 32. The opening 32 can extend through the outer wall 20 into the receptacle. In certain embodiments, the opening 32 can be in the shape of a square, rectangular, or other shape. The opening 32 can provide a pathway for filling a liquid within the tank 16. In certain embodiments, the opening 32 can be used in conjunction with a lid or plug for enclosing the tank 16 to contain liquid therein.

Figure 5:
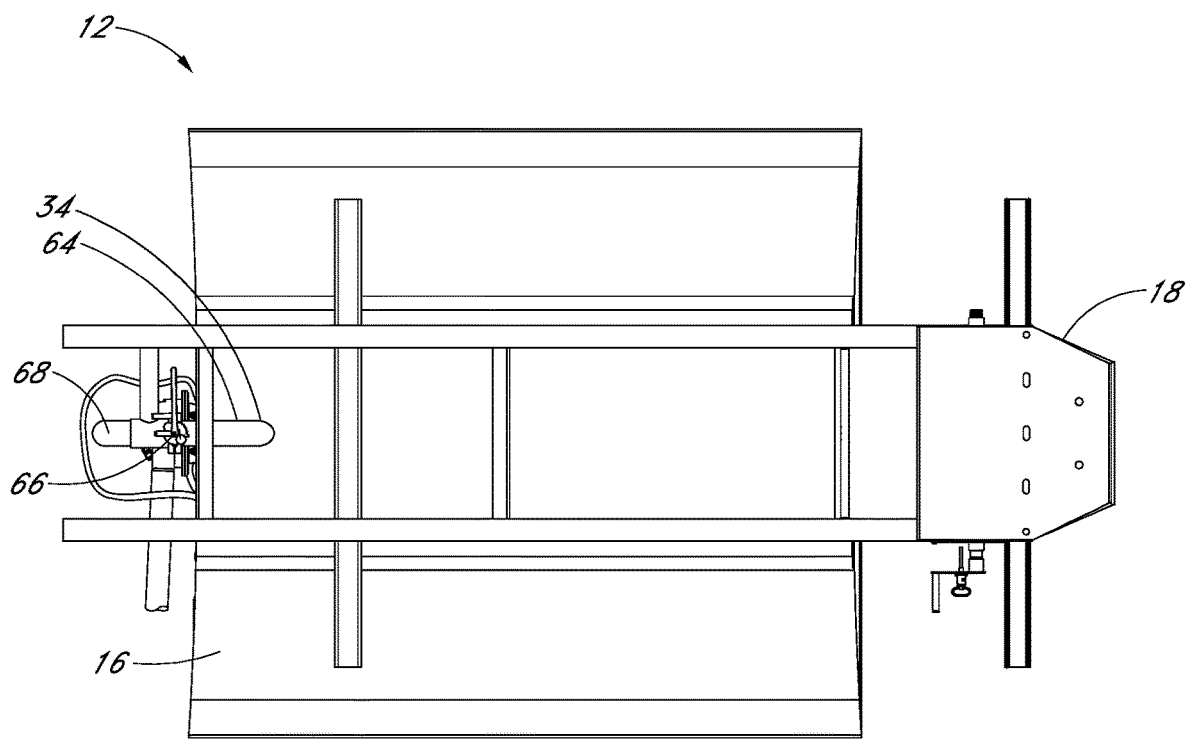
FIG. 5 is a bottom view of the tank body of FIG. 2.
Figure 6:
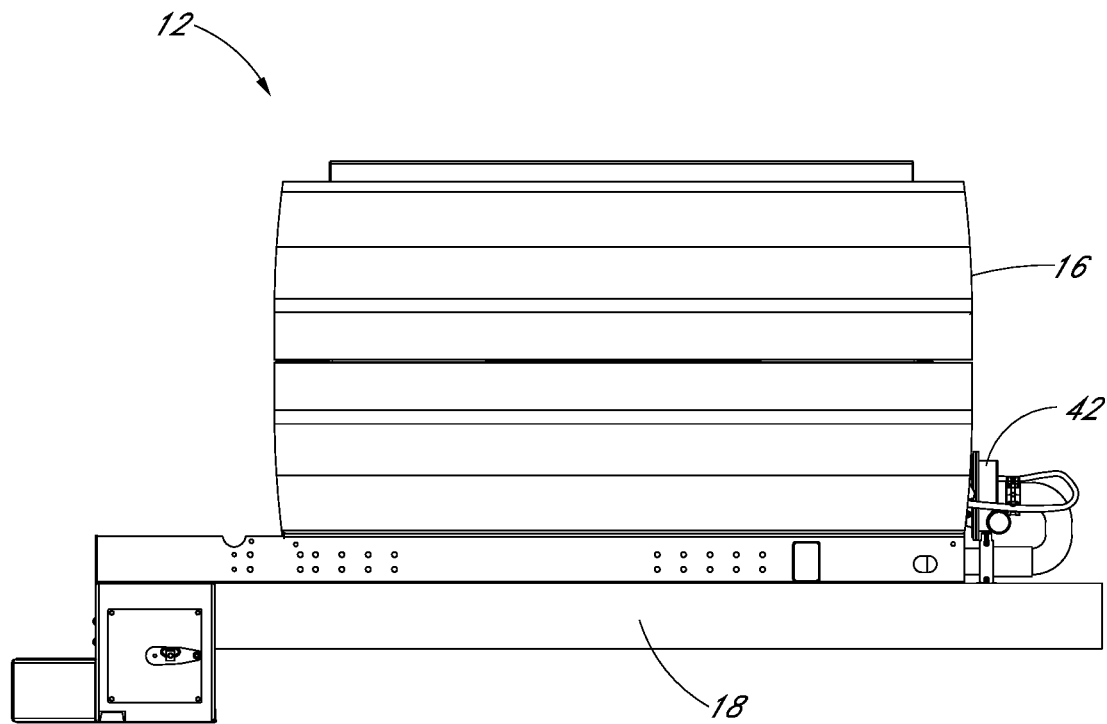
FIG. 6 is a right-side view of the tank body of FIG. 2.
Figure 7:
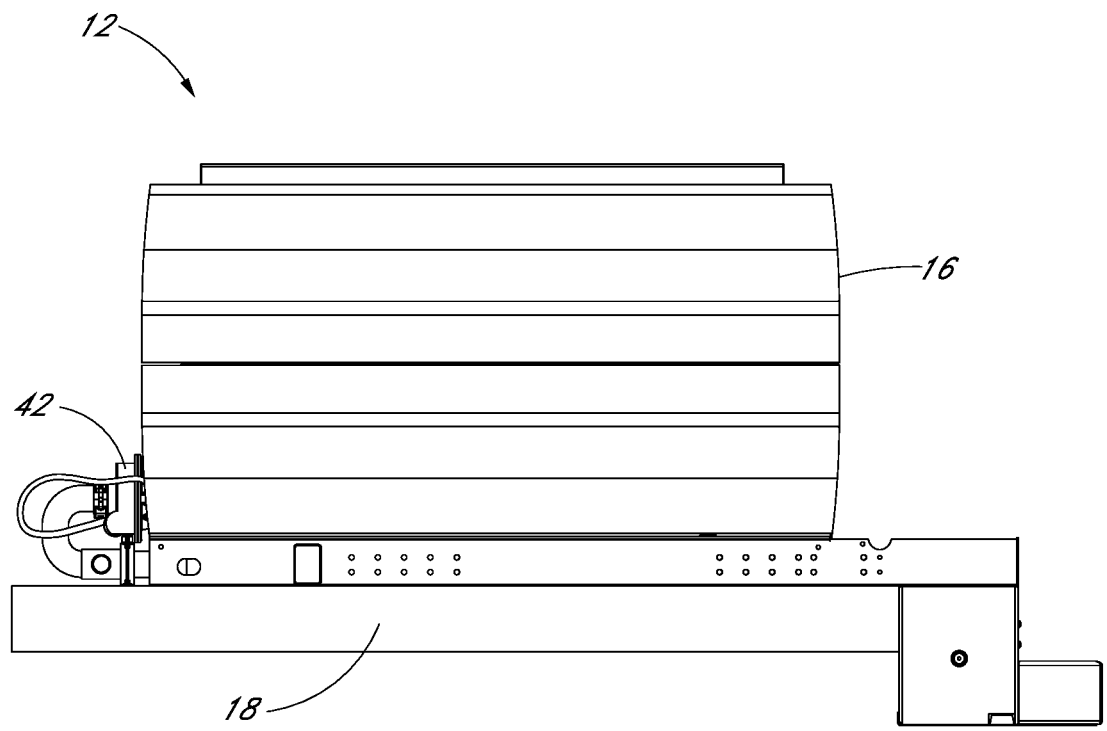
FIG. 7 is a left-side view of the tank body of FIG. 2.

FIG. 5 is a bottom view of the tank body 12 of FIG. 2 showing the drain 34 in the tank 16. In certain embodiments, liquid from inside the tank 16 is drawn from the drain 34 and into the liquid end 42 of the pump system 40 via the drain outlet 64. FIGS. 6 and 7 are a right-side and left-side views of the tank body 12 of FIG. 2, respectively.

Figure 8:
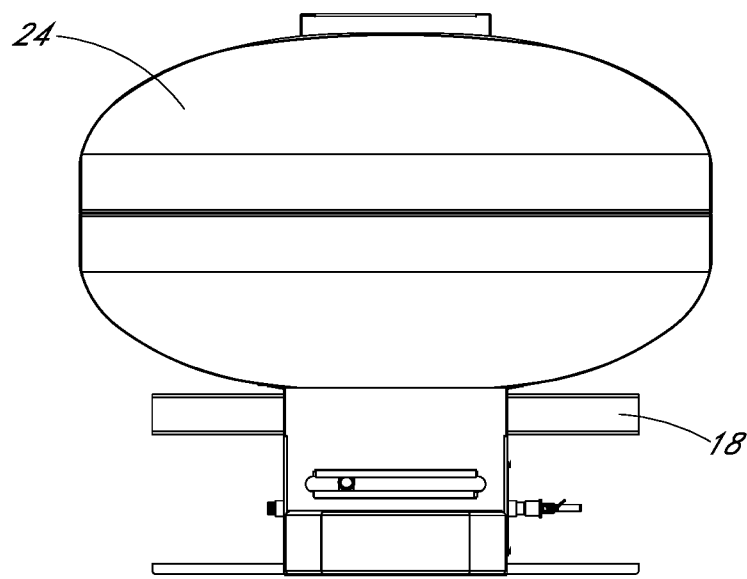
FIG. 8 is a rear view of the tank body of FIG. 2.
Figure 9:
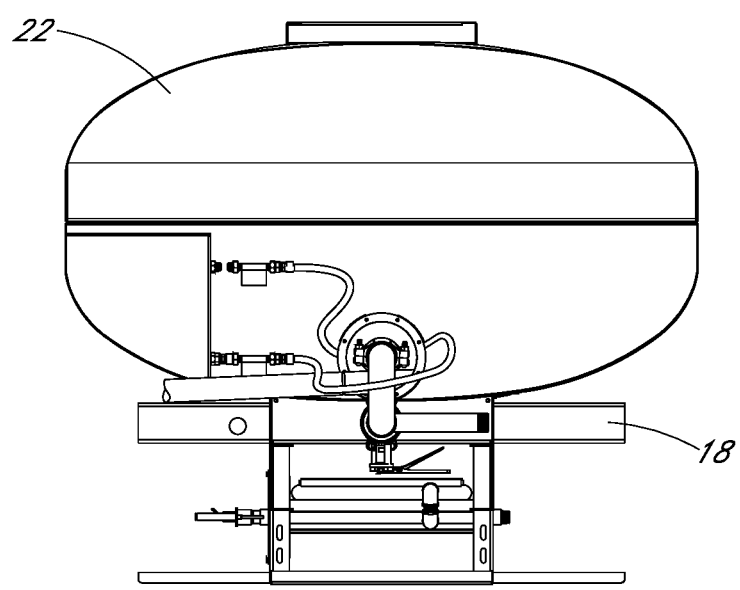
FIG. 9 is a front view of the tank body of FIG. 2.

FIG. 8 is a rear view of the tank body 12 of FIG. 2 showing the rear head 24 of the outer wall 20. FIG. 9 is a front view of the tank body 12 of FIG. 2 showing the front head 22 of the outer wall 20.

Figure 10:
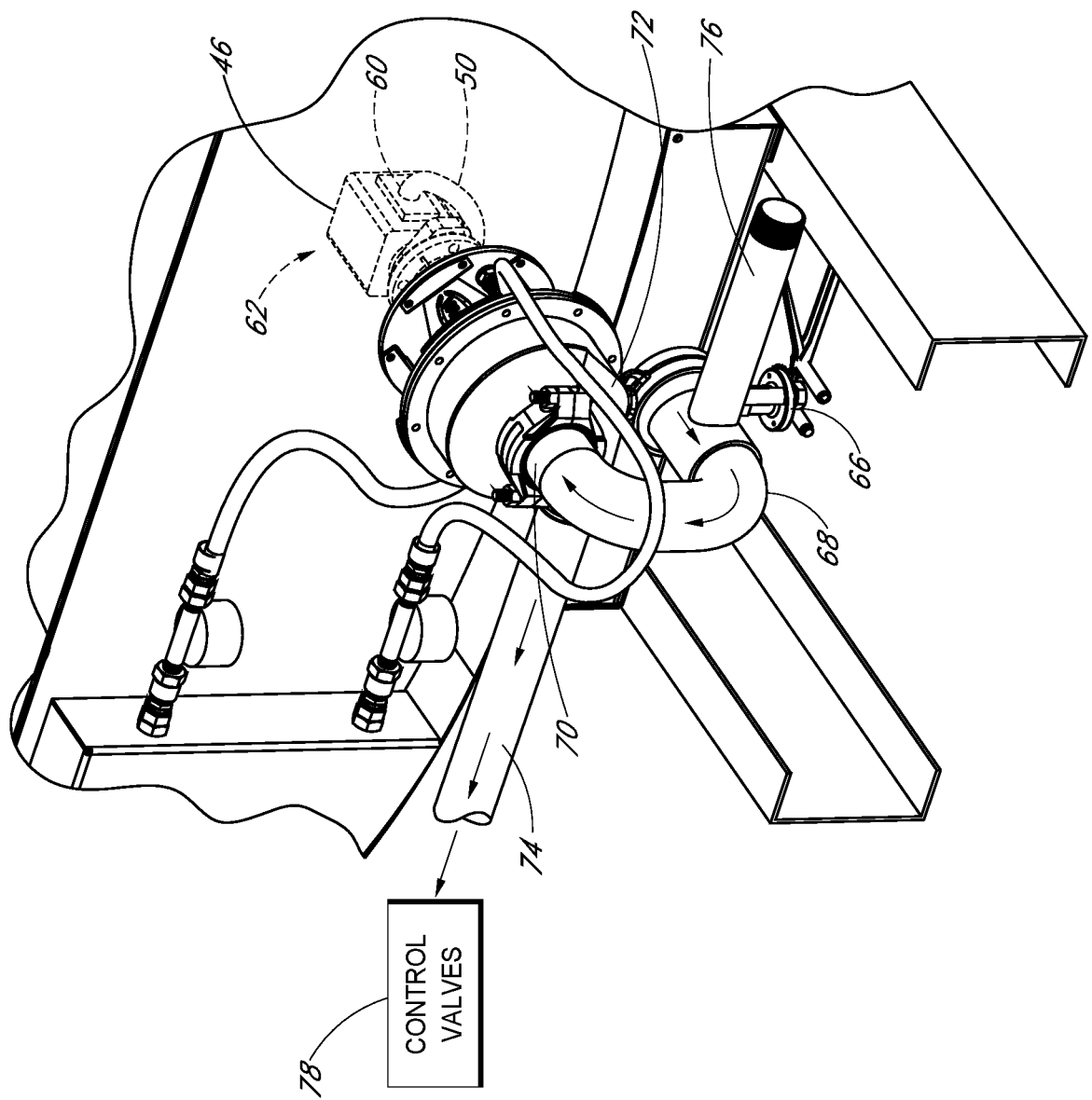
FIG. 10 is an enlarged view of a portion of the tank body taken along lines 10-10 from FIG. 3.

FIG. 10 is an enlarged view of a portion of the tank body 12 taken along lines 10-10 from FIG. 3. In certain embodiments, the hydraulic motor 46 includes an inlet 60 and an outlet 62. In certain embodiments, the inlet 60 and the outlet 62 are disposed on opposite sides of the hydraulic motor 46. In certain embodiments, the inlet 60 is in flow communication with the inlet line 50 while the outlet 62 is in flow communication with the outlet line 52.

Figure 14:
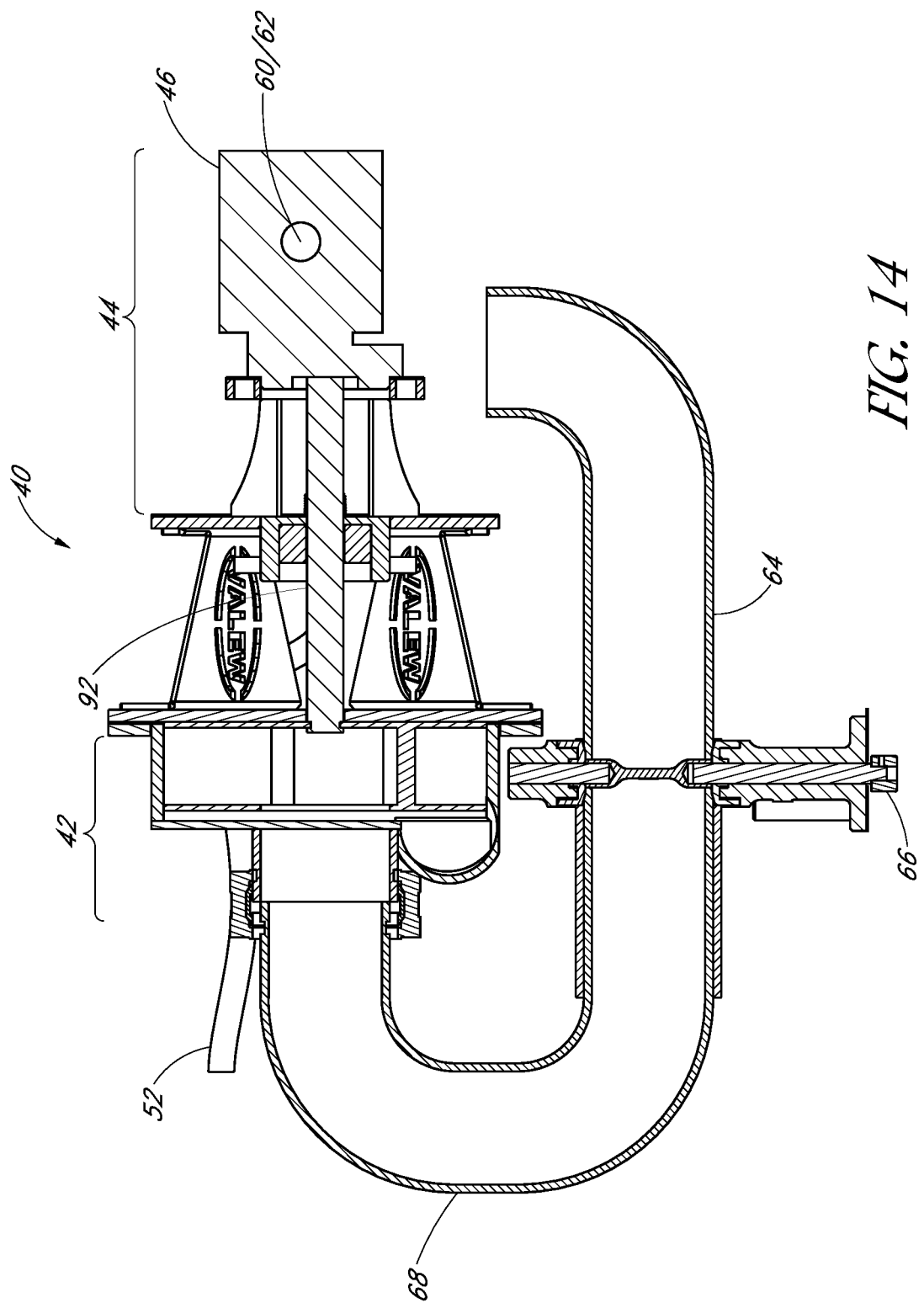
FIG. 14 is a section view taken along lines 14-14 in FIG. 11 of the pump system.

In certain embodiments, the flow of liquid from the tank 16 is drawn from the tank 16 via a tank outlet 64 (see FIG. 14). More specifically, in certain embodiments, gravity in combination with rotation of the impeller 110 draws the liquid from the tank 16. In certain embodiments, the flow entering the tank outlet 64 then passes through a valve 66 before entering a pump inlet pipe 68. In this way, in certain embodiments, a user can control the volume of liquid flowing from the tank 16 to the pump inlet pipe 68. Of course, the described pipes and their connections are only exemplary and other arrangements of pipes are contemplated and fall within the disclosure herein.

In certain embodiments, a safety switch (not shown) is employed to alert the user when the liquid level in the tank 16 is low. In certain embodiments, when the liquid is at a low level (e.g., below the level of the hydraulic motor 46 and/or the level of the reservoir 48) the heat transfer rate between the hydraulic motor 46 and the liquid in the tank 16 and/or the heat transfer rate between the reservoir 48 and the liquid in the tank 16 may be reduced. In certain embodiments, the safety switch can alert the user to take corrective action.

In certain embodiments, the flow from the pump inlet pipe 68 enters the liquid end 42 of the pump system 40 via a pump inlet 70. The pump inlet pipe 68 and the pump inlet 70 can be connected via any conventional means known in the art.

In certain embodiments, the pump system 40 includes a centrifugal pump for delivering the liquid at high pressure. In certain embodiments, the pump system 40 further includes a pump outlet 72 for the high pressure liquid. In this way, in certain embodiments, the pressure of the liquid exiting the pump outlet 72 is higher than the pressure of the liquid entering the pump inlet 70.

In certain embodiments, the pump system 40 includes the liquid end 42 and the power frame 44. In certain embodiments, the liquid end 42 is disposed outside of the tank 16. In certain embodiments, at least a portion of the power frame 44 is disposed in the tank 16. For example, in certain embodiments, the portion of the power frame 44 disposed in the tank 16 is the hydraulic motor 46. Accordingly, in some embodiments, portions of the pump system 40 are disposed in and out of the tank 16.

Figure 16:
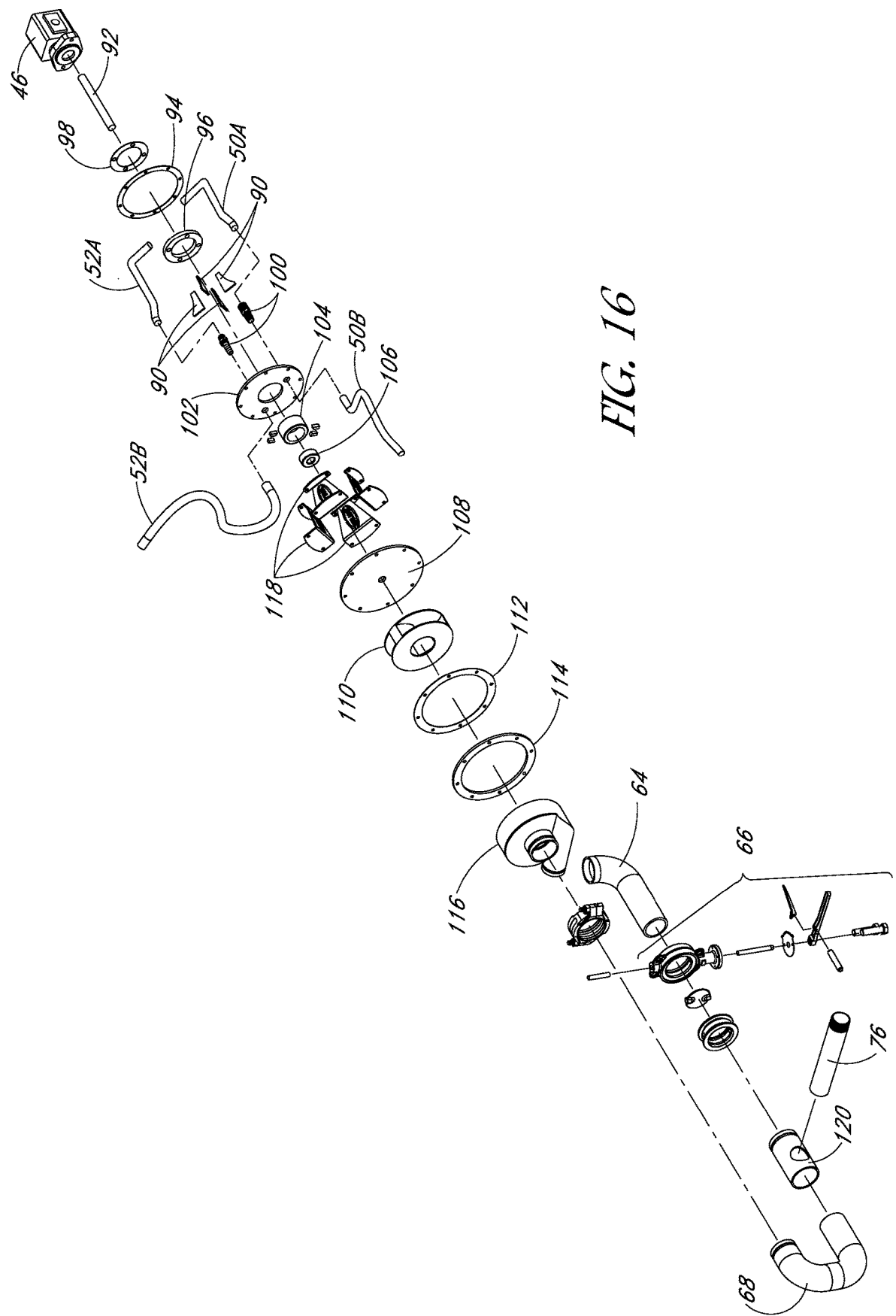
FIG. 16 is a perspective exploded view of the pump system from FIG. 15.

In certain embodiments, disposed within the liquid end 42 is the impeller 110 (See FIG. 16). In certain embodiments, the impeller 110 includes several vanes and is rotatable around a rotational axis of the shaft 92. In certain embodiments, the impeller 110 comprises a rotor in the shape of a disc or ring, as well as the several vanes mounted on the rotor. In certain embodiments, the several vanes are made from a metal or plastic.

As explained above, in certain embodiments, the hydraulic motor 46 drives the impeller 110. In certain embodiments, the term "centrifugal pumps" refers to those rotational or centrifugal pumps in which the fluid to be delivered flows in the direction of the rotational axis of the shaft 92 and the impeller 110, and leaves the liquid end 42 in a radial or tangential direction via the pump outlet 72.

In certain embodiments, a pump outlet pipe 74 is in flow communication with the pump outlet 72 and directs the high pressure flow of liquid to one or more control valve 78.

In certain embodiments, the pump system 40 includes a bypass line 76. The bypass line 76 allows a user to route a portion of the liquid exiting the tank 16 away from the control valves 78. In certain embodiments, the user controls a valve (not shown) to control the volume of liquid entering the bypass line 76. In certain embodiments, the redirected flow through the bypass line 76 is fed back to the tank 16.

Figure 11:
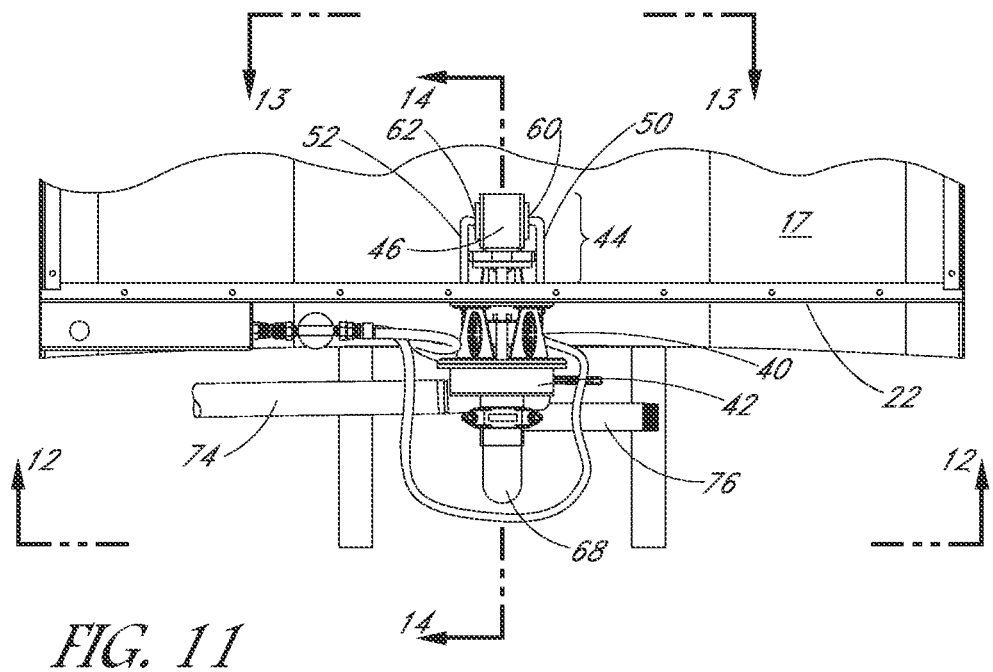
FIG. 11 is a partial section view of the tank body from FIG. 3 showing the liquid end outside the tank and the power frame inside the tank.

FIG. 11 is a partial section view of the tank body 12 from FIG. 3 showing the liquid end 42 outside the tank 16 and the power frame 44 inside the tank 16. In certain embodiments, the liquid end 42 of the pump system 40 is offset a distance away from the front head 22. In certain embodiments where the inlet line 50 and the return line 52 pass through the front head 22 in the region of the pump system 40, the offset provides a gap between the front head 22 and the liquid end 42 for the inlet line 50 and the return line 52 to enter the pump system 40. In this way, in certain embodiments, the inlet line 50 and the return line 52 pass through the front head 22 within a footprint of the pump system 40. In certain embodiments, such an arrangement removes any need to route the inlet line 50 and the return line 52 separately through the front head 22 or other portion of the outer wall 20 and into the tank 16. Of course, in certain embodiments, the gap can be reduced or removed. In certain embodiments, one or more of the inlet line 50 and the return line 52 can be routed through the outer wall 20 outside of the footprint of the pump system 40 against the front head 22. For example, in certain embodiments, one or more of the inlet line 50 and the return line 52 can be routed through the portion of the outer wall 20 covered by the reservoir 48.

Figure 12:
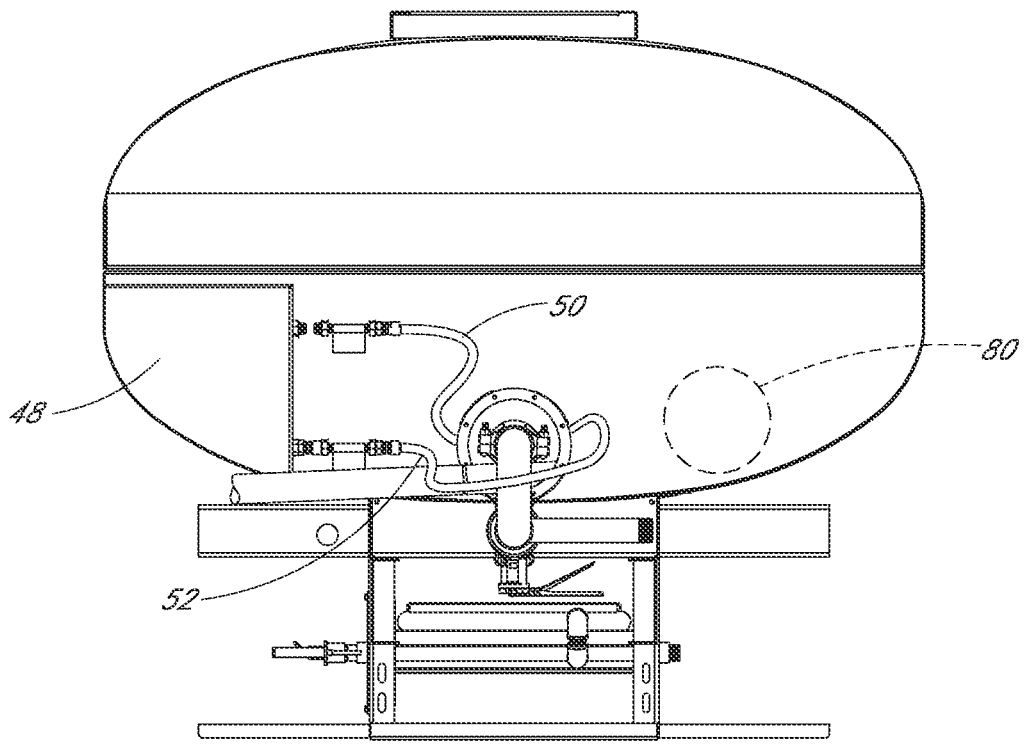
FIG. 12 is a front view of the tank body taken along lines 12-12 in FIG. 11 and also shows an optional location on the front of the tank for a second pump.

FIG. 12 is a front view of the tank body 12 taken along lines 12-12 in FIG. 11 and also shows an optional location on the front of the tank 16 for a second pump system 80. The second pump system 80 can be of the same size as the pump system 40 or of a different size. For example, in certain embodiments, the second pump system 80 can be sized smaller than the pump system 40. In such an embodiment, the smaller second pump system 80 can be dedicated for a different purpose than the purpose of the pump system 40. In certain embodiments, the second pump system 80 is a back-up to the pump system 40.

Figure 13:
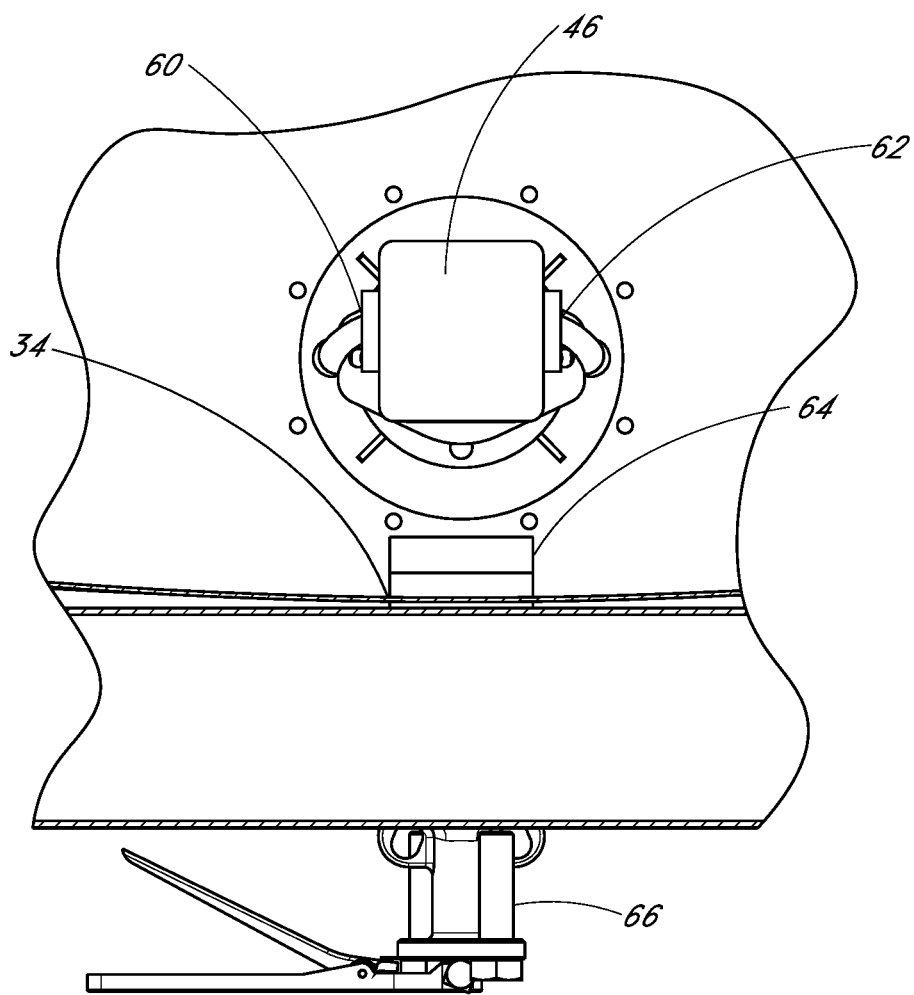
FIG. 13 is a view inside the tank taken along lines 13-13 in FIG. 11 showing the power frame.

FIG. 13 is a view inside the tank 16 taken along lines 13-13 in FIG. 11 showing the power frame 44. In certain embodiments, a distal end of the tank outlet 64 protruding into the tank 16 is also shown in FIG. 13. As is illustrated in FIG. 13, the flow entering the tank outlet 64 then passes through the valve 66. In this way, in certain embodiments, a user can control the volume of liquid flowing from the tank 16 to the pump inlet pipe 68.

FIG. 14 is a section view taken along lines 14-14 in FIG. 11 of the pump system 20. In certain embodiments, the flow of liquid from the tank 16 is drawn from the tank 16 via the tank outlet 64. More specifically, in certain embodiments, gravity in combination with rotation of the impeller 110 within the liquid end 42 draws the liquid from the tank 16. In certain embodiments, the flow entering the tank outlet 64 then passes through the valve 66 before entering the pump inlet pipe 68. In this way, in certain embodiments, a user can control the volume of liquid flowing from the tank 16 to the pump inlet pipe 68. In certain embodiment, the valve 66 is a gate valve. In other embodiments, the valve 66 is a ball valve or any other type of valve known to a person having ordinary skill in the art.

In certain embodiments, the flow from the pump inlet pipe 68 enters the liquid end 42 of the pump system 40 via a pump inlet 70. In certain embodiments, the pump inlet pipe 68 and the pump inlet 70 can be connected via any conventional means known in the art. Of course, the described pipes and their connections are only exemplary and other arrangements of pipes are contemplated and fall within the disclosure herein.

Figure 15:
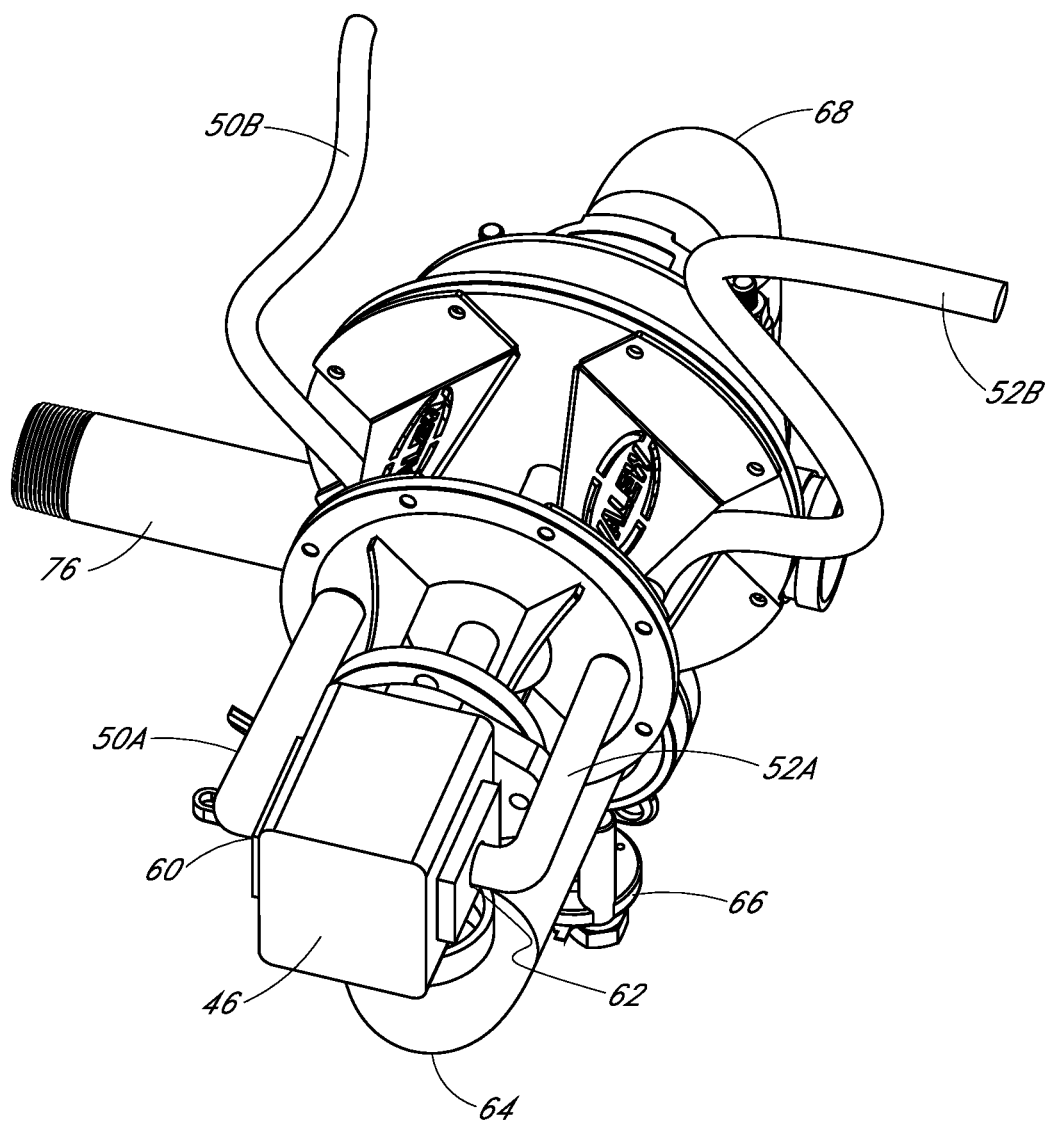
FIG. 15 is a perspective view of the pump system from FIG. 14 without the tank.

FIG. 15 is a perspective view of the pump system 40 from FIG. 14 without the tank 16. In certain embodiments, the return line 52 comprises more than one segment. For example, in certain embodiments, the return line 52 comprises the first segment 52A within the tank 16 and a second segment 52B outside the tank 16. Of course, the return line 52 is not limited to two segments and can comprise more than two segments. In certain embodiments, the segments are in fluid communication with each other.

In certain embodiments, the inlet line 50 comprises more than one segment. For example, in certain embodiments, the inlet line 50 comprises the first segment 50A within the tank 16 and the second segment 50B outside the tank 16. Of course, the inlet line 50 is not limited to two segments and can comprise more than two segments. In certain embodiments, the segments are in fluid communication with each other.

FIG. 16 is a perspective exploded view of the pump system 40 from FIG. 15. The pump system 40 illustrated in FIG. 16 generally includes the liquid end 42 and the power frame 44. In certain embodiments, the pump system 40 includes the shaft 92 which is in rotational engagement with the impeller 110 in the liquid end 42 and the hydraulic motor 46 in the power frame 44.

In certain embodiments, the power frame 44 includes one or more rings 94, 96, 98. In certain embodiments, the ring 94 can be used to in part secure the power frame 44 to the front head 22. In certain embodiments, the ring 94 secures to a plate 102 disposed on the other side of the front head 22 from the ring 94.

In certain embodiments, the ring 98 can secure the ring 96 to an end of one or more supports 90 of the power frame 44.

In certain embodiments, an opposite end of each of the one or more supports 90 is secured to the plate 102. In certain embodiments, the plate 102 abuts against an outer surface of the front head 22.

In certain embodiments, the plate 102 supports one or more couplings 100. In certain embodiments, the first segment 50A and the second segment 50B of the inlet line 50 connect to opposite ends of one of the couplings 100. Similarly, in certain embodiments, the first segment 52A and the second segment 52B of the return line 52 connect to opposite ends of one of the couplings 100. In certain embodiments, the one or more couplings 100 extend through the front head 22 so as to allow the opposite ends of the couplings 100 to be accessible for connection to the first and second segments of the inlet line 50 and the return line 52. Such an arrangement, in certain embodiments, may be advantageous because it allows the user to remove and replace only one segment without disturbing the second segment of the same line.

In certain embodiments, a bearing 106 is disposed about the shaft 92. In certain embodiments, the bearing 106 holds the rotating shaft 92 within the pump system 40 and transfers radial loads experienced by the shaft 92 to the pump system 40. In this way, in certain embodiments, the bearing 106 provides for free rotation of the shaft 92 about the axis of the shaft 92. In certain embodiments, the bearing 106 is a rotary bearing.

In certain embodiments, a seal 104 is disposed about the bearing 106. In certain embodiments, the seal 104 is a gland seal. For example, in certain embodiments, when configured as a gland packing seal, the gland of the seal 104 can be packed with string or rope which has been soaked in tallow or similar grease. In other embodiments, the seal 104 is configured as a mechanical seal or any other type of seal known to a person having ordinary skill in the art. In certain embodiments, configuring the seal 104 as a gland seal can provide an advantage of being less susceptible to leaking if sand or other debris enters the seal 104 and/or contacts the shaft 92.

In certain embodiments, the pump system 40 includes one or more struts 118. In certain embodiments, the one or more struts 118 connect the plate 102 to a plate 108 of the liquid end 42. In certain embodiments, the plate 108 is further attached to a casing 116 so as to form a housing for the impeller 110. In certain embodiments, one or more rings 112, 114 can be employed to secure and seal the plate 108 to the casing 116 so as to prevent leakage there between.

In certain embodiments, the pump system 40 comprises the tank outlet 64. In certain embodiments, the tank outlet 64 is in flow communication with the inside of the tank 16. In certain embodiments, flow entering the tank outlet 64 then passes through the valve 66 before entering the pump inlet pipe 68. In certain embodiments, the flow from the pump inlet pipe 68 then enters the liquid end 42 of the pump system 40.

In certain embodiments, the pump system 40 includes the bypass line 76. In certain embodiments, the bypass line 76 allows a user to route a portion of the liquid exiting the tank 16 away from the control valves 78. In certain embodiments, the user controls a valve (not shown) to control the volume of liquid entering the bypass line 76. In certain embodiments, the redirected flow through the bypass line 76 is fed back to the tank 16. In certain embodiments, the pump system 40 includes a t-connector 120. In certain embodiments, the t-connector 120 provides a fluid connection between the pump inlet pipe 68 and the bypass line 76.

Figure 17:
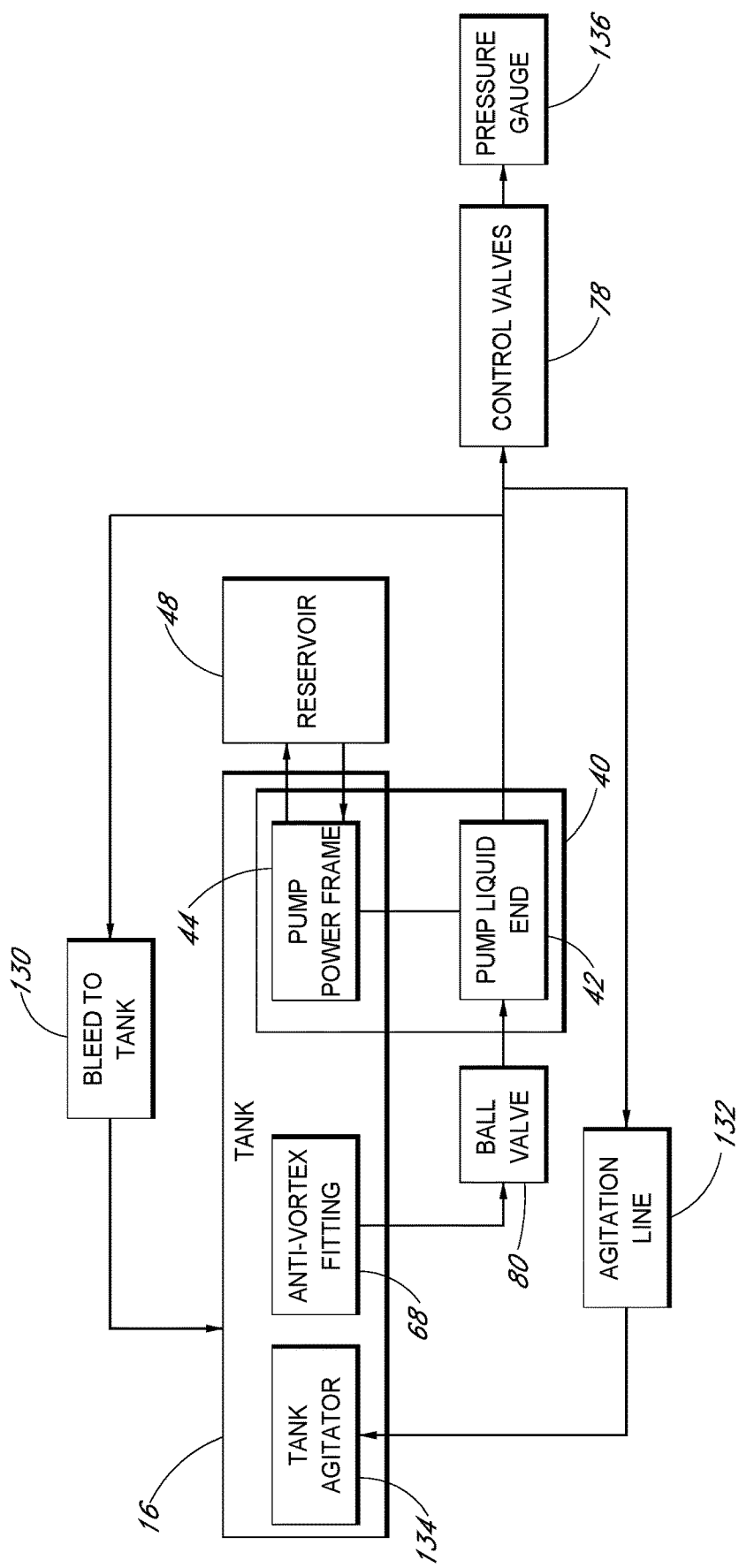
FIG. 17 is a schematic view of exemplary fluid flow paths to and from the pump system of FIG. 3.

FIG. 17 is a schematic view of exemplary fluid flow paths to and from the pump system 40 of FIG. 3. In certain embodiments, the liquid end 42 is disposed outside of the tank 16. In certain embodiments, at least a portion of the power frame 44 is disposed in the tank 16. For example, in certain embodiments, the portion of the power frame 44 disposed in the tank 16 is the hydraulic motor 46. Accordingly, in some embodiments, portions of the pump system 40 are disposed in and out of the tank 16.

In certain embodiments that include the reservoir 48, the reservoir 48 can be placed in close proximity to the tank 16. While a gap is illustrated in FIG. 17 between the reservoir 48 and the tank 16, no gap is necessary. In embodiments that have a gap, a paste or other conductive material can be placed between the wall of the reservoir 48 and the outer wall 20 to promote heat transfer there between. In certain embodiments, a coating is placed on one or more of the surfaces of the wall/barrier that promotes heat transfer.

In certain embodiments, by placing the reservoir 48 in close proximity to the tank 16 and the relatively low temperature liquid contained therein, a rate of heat transfer from the working fluid in the reservoir 48 to the liquid in the tank 16 can be increased as compared to a configuration where the reservoir 48 is not in close proximity to the tank 16. In certain embodiments, this heat transfer can be by, for example, conduction through the wall/barrier between the working fluid and the liquid in the tank 16.

In the illustrated schematic, the reservoir 48 is disposed outside the tank 16 and on the front head 22. Of course, the reservoir 48 need not be placed outside the tank 16 or on the front head 22. In other embodiments, the reservoir 48 is disposed inside the tank 16. In other embodiments, the reservoir 48 is disposed outside the tank 16 and on the rear head 24. In other embodiments, the reservoir 48 is disposed on any of the one or more surfaces of the outer wall 20. For example, the reservoir 48 can be placed on the bottom portion 28 of the tank 16. It may be advantageous to dispose the reservoir 48 in a lower region of the tank 16 to maintain close proximity between the working fluid and the liquid in the tank 16 as the level of the liquid drops in the tank 16.

In certain embodiments, the pump system 40 includes a bleed to tank line 130. In certain embodiments, the bleed to tank line 130 can route flow of liquid from the bypass line 76 back to the tank 16. In certain embodiments, the bypass line 76 allows a user to route a portion of the liquid exiting the tank 16 away from the control valves 78. In certain embodiments, the user controls a valve (not shown) to control the volume of liquid entering the bypass line 76.

In certain embodiments, the pump system 40 includes an agitation line 132 and a tank agitator 134 disposed in the tank 16. In certain embodiments, the agitation line 132 can route high pressure flow exiting the liquid end 42 back to the tank 16. In this way, in certain embodiments, excess liquid exiting the liquid end 42 is returned to the tank 16. In certain embodiments, a pressure relief or other design valve can be employed in the agitation line 132. In certain embodiments, the pump system 40 includes a pressure gage 136 to monitor the pressure of the liquid exiting the liquid end 42.

In certain embodiments, a spray system having spray booms (not shown) is employed downstream of the control valves 78. In this way, the truck 10 can transport and pump liquid from inside the tank 16 and spray or expel the pumped liquid at high pressure from the spray booms.

Certain Terminology

Terms of orientation used herein, such as "top," "bottom," "proximal," "distal," "longitudinal," "lateral," and "end," are used in the context of the illustrated example. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain examples include or do not include, certain features, elements, and/or steps. Thus, such conditional language is not generally intended to imply that features, elements, and/or steps are in any way required for one or more examples.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

The terms "approximately," "about," and "substantially" as used herein represent an amount close to the stated amount that still performs a desired function or achieves a desired result. For example, in some examples, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain examples, as the context may dictate, the term "generally parallel" can refer to something that departs from exactly parallel by less than or equal to 20 degrees. All ranges are inclusive of endpoints.

Several illustrative examples of tanks have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one example in this disclosure can be combined or used with (or instead of) any other portion of any of the steps, processes, structures, and/or devices disclosed or illustrated in a different example or flowchart. The examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various examples can be used in all other examples set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures or description herein. For example, various functionalities provided by the illustrated modules can be combined, rearranged, added, or deleted. In some implementations, additional or different processors or modules may perform some or all of the functionalities described with reference to the examples described and illustrated in the figures. Many implementation variations are possible. Any of the features, structures, steps, or processes disclosed in this specification can included in any example.

In summary, various examples of pump systems and related methods have been disclosed. This disclosure extends beyond the specifically disclosed examples to other alternative examples and/or other uses of the examples, as well as to certain modifications and equivalents thereof. Moreover, this disclosure expressly contemplates that various features and aspects of the disclosed examples can be combined with, or substituted for, one another. Accordingly, the scope of this disclosure should not be limited by the particular disclosed examples described above but should be determined only by a fair reading of the claims.

What is claimed is:

1. A tank body for transporting and spraying water, the tank body comprising:
    a plurality of walls forming a receptacle configured to receive the water; and
    a pump system supported by at least one of the plurality of walls, the pump system comprising a liquid end, a power frame, and a pump outlet pipe, at least a portion of the power frame being configured to be disposed in the water in the receptacle, the pump system being configured to raise a pressure level of the water to a high pressure, wherein the liquid end comprises an impeller in flow communication with the water in the receptacle, and wherein the impeller and the pump outlet pipe are disposed outside the receptacle; and
    a spray system configured to spray the water at the high pressure away from the tank body,
    wherein the liquid end further comprises a pump inlet pipe disposed outside of the receptacle.

2. The tank body of claim 1, wherein the power frame comprises a hydraulic motor, and wherein the portion of the power frame disposed inside the receptacle is the hydraulic motor.

3. The tank body of claim 1, comprising a tank supported by a frame, the receptacle being disposed in the tank, the frame being configured to be supported by a chassis, the chassis being configured to transport the water.

4. A tank body for transporting water, the tank body comprising:
    a wall forming a receptacle configured to receive the water;
    a pump system supported by the wall and comprising a hydraulic motor, an impeller, and a pump outlet pipe, the hydraulic motor being configured to be disposed in the water in the receptacle and the impeller and the pump outlet pipe being disposed outside the receptacle, the pump system being configured to raise a pressure level of the water to a high pressure, the impeller being in flow communication with the water in the receptacle; and
    a spray system configured to spray the water at the high pressure away from the tank body,
    wherein the pump system further comprises a pump inlet pipe disposed outside of the receptacle.

5. The tank body of claim 4, wherein the hydraulic motor is configured to be driven by a working fluid.

6. The tank body of claim 5, wherein the working fluid is a hydraulic fluid.

7. The tank body of claim 5, wherein the working fluid is a food grade oil.

8. The tank body of claim 4, wherein the pump system further comprises a centrifugal pump.

9. A tank body for transporting water, the tank body comprising:
- a wall forming a receptacle configured to receive the water;
- a pump system comprising a hydraulic motor, a pump, and a pump outlet pipe, the hydraulic motor being configured to drive the pump, the hydraulic motor being configured to be disposed in the water inside the receptacle, the pump comprising an impeller, and wherein the impeller and the pump outlet pipe are disposed outside the receptacle, the pump system being configured to raise a pressure level of the water to a high pressure, the impeller being in flow communication with the water in the receptacle; and
- a spray system configured to spray the water at the high pressure away from the tank body, wherein the pump system further comprises a pump inlet pipe disposed outside of the receptacle.

10. The tank body of claim 9, wherein the hydraulic motor and the pump share a drive shaft.

11. The tank body of claim 9, wherein the hydraulic motor is configured to be driven by a working fluid.

12. The tank body of claim 11, wherein the working fluid is a hydraulic fluid.

13. The tank body of claim 11, wherein the working fluid is a food grade oil.

14. The tank body of claim 11, further comprising an inlet line and a return line, and wherein the inlet line and the return line are configured to provide a flow path for the working fluid to reach the hydraulic motor.

15. The tank body of claim 14, wherein the inlet line and the return line pass through the wall at a location.

* * * * *